United States Patent
Zhang et al.

(10) Patent No.: US 10,650,616 B2
(45) Date of Patent: *May 12, 2020

(54) FAULT DIAGNOSIS USING DISTRIBUTED PCA ARCHITECTURE

(71) Applicants: Toyota Motor Engineering & Manufacturing North America, Inc., Plano, TX (US); University of Connecticut, Farmington, CT (US)

(72) Inventors: Lingyi Zhang, Farmington, CT (US); Weiqiang Chen, Farmington, CT (US); Krishna Pattipatti, Farmington, CT (US); Ali M. Bazzi, Farmington, CT (US); Shailesh N. Joshi, Ann Arbor, MI (US); Ercan M. Dede, Ann Arbor, MI (US)

(73) Assignees: UNIVERSITY OF CONNECTICUT, Farmington, CT (US); TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/947,662

(22) Filed: Apr. 6, 2018

(65) Prior Publication Data
US 2019/0311552 A1 Oct. 10, 2019

(51) Int. Cl.
*G07C 5/00* (2006.01)
*G07C 5/08* (2006.01)
*G06N 20/00* (2019.01)

(52) U.S. Cl.
CPC ............ *G07C 5/008* (2013.01); *G06N 20/00* (2019.01); *G07C 5/0808* (2013.01); *G07C 5/0816* (2013.01)

(58) Field of Classification Search
CPC .... G07C 5/085; G07C 5/0816; G07C 5/0808; G06F 17/15; H01M 10/44; A61B 5/0002; G06N 20/00
See application file for complete search history.

(56) References Cited

U.S. PATENT DOCUMENTS

| | | |
|---|---|---|
| 4,379,990 A | 4/1983 | Sievers et al. |
| 6,732,063 B2 | 5/2004 | Famili et al. |
| (Continued) | | |

FOREIGN PATENT DOCUMENTS

| | | |
|---|---|---|
| CN | 104778337 | 7/2015 |
| CN | 105675038 | 6/2016 |
| CN | 106169001 | 11/2016 |

OTHER PUBLICATIONS

Das et al., Adaptive prognostic approaches combining regime identification with equipment operating history, 2010, IEEE, p. 1-6 (Year: 2010).*

(Continued)

*Primary Examiner* — McDieunel Marc
(74) *Attorney, Agent, or Firm* — Snell & Wilmer LLP

(57) ABSTRACT

A system includes a vehicle having an electronic device, a sensor designed to detect sensor data corresponding to at least one property of the electronic device, an output device designed to output data, and a vehicle network access device designed to transmit the sensor data. The system also includes a machine learning server separate from the vehicle and having a machine learning processor designed to receive the sensor data, and generate, using a machine learning algorithm, a model of the electronic device. The machine learning processor is also designed to determine that a fault is likely to occur with the electronic device by conducting a T squared statistical analysis of the sensor data using the model, and generate a signal to be transmitted to the vehicle (Continued)

network access device when the fault is likely to occur and output information indicating that the fault is likely to occur.

20 Claims, 7 Drawing Sheets

(56) References Cited

U.S. PATENT DOCUMENTS

| | | | |
|---|---|---|---|
| 7,233,886 | B2 | 6/2007 | Wegerich et al. |
| 7,260,501 | B2 | 8/2007 | Pattipatti et al. |
| 7,715,961 | B1 | 5/2010 | Kargupta |
| 8,301,333 | B2 | 10/2012 | Singh et al. |
| 8,301,406 | B2 | 10/2012 | Lee et al. |
| 8,509,985 | B2 | 8/2013 | Subramania et al. |
| 8,543,282 | B2 | 9/2013 | Hansson et al. |
| 8,600,685 | B2 | 12/2013 | Kalgren et al. |
| 8,880,054 | B2 | 11/2014 | Wesby |
| 9,194,376 | B2 | 11/2015 | Ritter et al. |
| 9,489,340 | B2 | 11/2016 | Safa-Bakhsh et al. |
| 9,729,639 | B2 | 8/2017 | Sustaeta et al. |
| 10,354,462 | B1 * | 7/2019 | Zhang ................. G07C 5/085 |
| 10,482,226 | B1 * | 11/2019 | Konrardy ............. B60W 40/04 |
| 2005/0273277 | A1 | 12/2005 | Ridnour et al. |
| 2007/0022074 | A1 * | 1/2007 | Muramatsu .......... A61B 5/0002 706/50 |
| 2016/0035152 | A1 | 2/2016 | Kargupta |
| 2016/0093117 | A1 | 3/2016 | Ahn et al. |
| 2017/0305404 | A1 * | 10/2017 | Komatsu ............. H01M 10/44 |
| 2018/0217284 | A1 * | 8/2018 | Zhao ..................... G06F 17/15 |
| 2019/0042867 | A1 * | 2/2019 | Chen .................... G06F 16/951 |

OTHER PUBLICATIONS

Mathew et al., Sensor health monitoring using simple data driven approaches, 2016, IEEE, p. 32-38 (Year: 2016).*

Jhou et al.,The Implementation of OBD-II Vehicle Diagnosis System Integrated with Cloud Computation Technology, 2014, IEEE, p. 9-12 (Year: 2014).*

Das et al., An efficient way to enable prognostics in an onboard system, 2015, IEEE, p. 1-7 (Year: 2015).*

Alkaya et al.; "Variance Sensitive Adaptive threshold-Based PCA Method for Fault Detection with Experimental Application"; *ISA Transactions*; vol. 50; pp. 287-302 ; (2011).

Angelov et al.; "An Approach to Model-Based Fault Detection in Industrial Measurement Systems with Application in Engine Test Benches"; *Meas. Sci.Technol.*; vol. 17; 1809-1818; 2006.

Antory et al.; "Diagnosis of CAM Profile Switching of an Automobile Gasoline Engine"; 6 pages.

Bakdi et al.; "Improved Process Monitoring Using PCA Methods and Adaptive Threshold Scheme"; *The 5$^{th}$ International Conference on Electrical Engineering-Boumerdes (ICEE-B)*; Oct. 29-31, 2017.

Elshenawy et al.; "Efficient Recursive Principal Component Analysis Algorithms for Process Monitoring"; *Ind. Eng. Chem. Res.*; vol. 19; pp. 252-259; 2010.

Fu et al.; "Principal Component Analysis Based on Drive Cycles for Hybrid Electric Vehicle"; IEEE; pp. 1613-1618; 2009.

Hashemi et al.; "Adaptive Threshold-Based Fault Detection and Isolation for Automotive Electrical Systems"; *Proceedings of the 8$^{th}$ World Congress on Intelligent Control and Automation IEEE*; pp. 1013-1018; Jun. 21-25, 2011.

Ho, Lok Man; "Application of Adaptive Thresholds in Robust Fault Detection of an Electro-Mechanical Single-Wheel Steering Actuator"; *8$^{th}$ IFAC Symposium on Fault Detection, Supervision and Safety of Technical Processes*; pp. 259-264; Aug. 29-31, 2012.

Huang et al.; "An Intelligent Multifeature Statistical Approach for the Discrimination of Driving Conditions of a Hybrid Electric Vehicle"; *IEEE Transactions on Intelligent Transportation Systems*; vol. 12, No. 20, Jun. 2011.

Kargupta et al.; "VEDAS: A Mobile and Distributed Data Stream Mining System for Real-time Vehicle Monitoring"; pp. 300-311.

Mohammadpour et al.; "A Survey on Diagnostic Methods for Automotive Engines"; *Int. J. Engine Res.*; vol. 00; pp. 1-24; 2010.

Mohan et al.; "A Comparison of Methods for Linear Cell-to-Cell Mapping and Application Example for Fault Detection and Isolation"; *European Conference of the Prognostics and Health Management Society*; 11 pages; 2014.

Shi et al.; "The Development of an Adaptive Threshold for Model-Based Fault Detection of Nonlinear Electro-Hydraulic System"; *Control Engineering Practice*; vol. 13; pp. 1357-1367; 2015.

Singh et al.; "Data-Driven Framework for Detecting Anomalies in Field Failure Data"; *IEEE Paper #1221*, Version 2; 14 pages; Jan. 3, 2011.

Svensson et al.; "Vehicle Diagnostics Method for Anomaly Detection and Fault Identification Software"; *SAE International*; 7 pages; 2009.

Fusco et al.; "An Approach to Design a Prognostic Based Maintenance Strategy for Railway Power Converter Unit"; IEEE; 6 pages; 2015.

Davis et al.; "Predictive & Prognostic Controller for Wide Band Gap (Silicon Carbide) Power Conversion"; *IEEE Aerospace Conf.*; 18 pages; 2007.

Lasheras et al.; "A Hybrid PCA-CART-MARS-Based Prognostic Approach of the Remaining Useful Life for Aircraft Engines"; Sensors (Basel); 15 (3), pp. 7062-7083, Mar. 2015.

* cited by examiner

FAULT DIAGNOSIS USING DISTRIBUTED PCA ARCHITECTURE

BACKGROUND

1. Field

The present disclosure relates to systems and methods for identifying electronic components of vehicles that are likely to fail within a predetermined amount of time and, more particularly, to systems and methods of distributed monitoring of such electronic vehicle components.

2. Description of the Related Art

Vehicles continue to include more and more electronic devices. Such electronic devices may be subject to relatively large variations in ambient temperature, quantity of power cycles, frequency, and range of cycling. Conventional sensors are capable of sensing data usable to identify when the electronic device has already failed. However, the corresponding vehicle may operate undesirably in response to failure of the electronic device.

Thus, systems and methods for identifying when a fault is likely to occur in an electronic device of a vehicle are desirable.

SUMMARY

Described herein is a system for analyzing a health status of a component of vehicles. The system includes a vehicle having an electronic device and a sensor designed to detect sensor data corresponding to at least one property of the electronic device. The vehicle also includes an output device designed to output data. The vehicle also includes a vehicle network access device designed to transmit the sensor data. The system also includes a machine learning server separate from the vehicle and having a machine learning processor. The machine learning processor is designed to receive the sensor data and generate, using a machine learning algorithm, a model of the electronic device. The machine learning processor is also designed to determine that a fault is likely to occur with the electronic device by conducting a T squared statistical analysis of the sensor data using the model. The machine learning processor is also designed to generate a signal to be transmitted to the vehicle network access device when the fault is likely to occur such that the output device of the vehicle outputs information indicating that the fault is likely to occur.

Also disclosed is a system for analyzing a health status of a component of a vehicle. The system includes a plurality of vehicles each having an electronic device and a sensor designed to detect sensor data corresponding to at least one property of the electronic device. Each of the plurality of vehicles further includes an output device designed to output data, and a vehicle network access device configured to transmit the sensor data of the electronic device. The system also includes a machine learning server separate from each of the plurality of vehicles and having a machine learning processor. The machine learning processor is designed to receive the sensor data of the electronic device for each of the plurality of vehicles, and generate, using a machine learning algorithm, a model of the electronic device. The machine learning processor is also designed to determine that a fault is likely to occur with the electronic device of at least one of the plurality of vehicles by conducting a T squared statistical analysis of the sensor data using the model. The machine learning processor is also designed to generate a signal to be transmitted to the vehicle network access device of the at least one of the plurality of vehicles when the fault is likely to occur such that the output device of the at least one of the plurality of vehicles outputs information indicating that the fault is likely to occur.

Also disclosed is a method for analyzing a health status of a component of vehicles. The method includes detecting, by a sensor coupled to or positioned near an electronic device of a vehicle, sensor data corresponding to at least one property of the electronic device. The method also includes transmitting, by a vehicle network access device of the vehicle, the sensor data of the electronic device. The method also includes receiving, by a machine learning processor of a machine learning server being separate from the vehicle, the sensor data of the electronic device. The method also includes generating, by the machine learning processor, a model of the electronic device. The method also includes determining, by the machine learning processor, that a fault is likely to occur with the electronic device by conducting a T squared statistical analysis of the sensor data using the model. The method also includes outputting, by an output device of the vehicle, information indicating that the fault is likely to occur.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for identifying when faults are likely to occur within electronic components of vehicles. An exemplary system includes one or more vehicle having an electronic component and a sensor designed to detect data corresponding to the electronic component. The system also includes a machine learning server that is designed to receive the detected data and create a model of the electronic component based on the detected data. The machine learning server may continue receiving the detected data and may identify when a fault is likely to occur with the electronic component based on the model and the detected data.

The systems and methods described herein provide several benefits and advantages such as predicting failure of an electronic component before the component actually fails. This is beneficial because the prediction of the failure may provide an operator of the vehicle with ample time to take the vehicle for repair prior to actual failure of the component. The systems are capable of making such predictions using a machine learning algorithm which is advantageously performed using a machine learning processor that is separate from the vehicle. Because the machine learning processor makes the predictions, the cost of the vehicles may remain relatively low due to the reduced amount of processing ability required onboard the vehicle. Additionally, the machine learning server may advantageously generate a model based on data from multiple vehicles, resulting in a higher quality model. Because the machine learning processor receives data from multiple vehicles, the machine learning processor may identify commonalities between failures, which may advantageously provide vehicle designers with information on how to improve future vehicle models.

Figure 1:
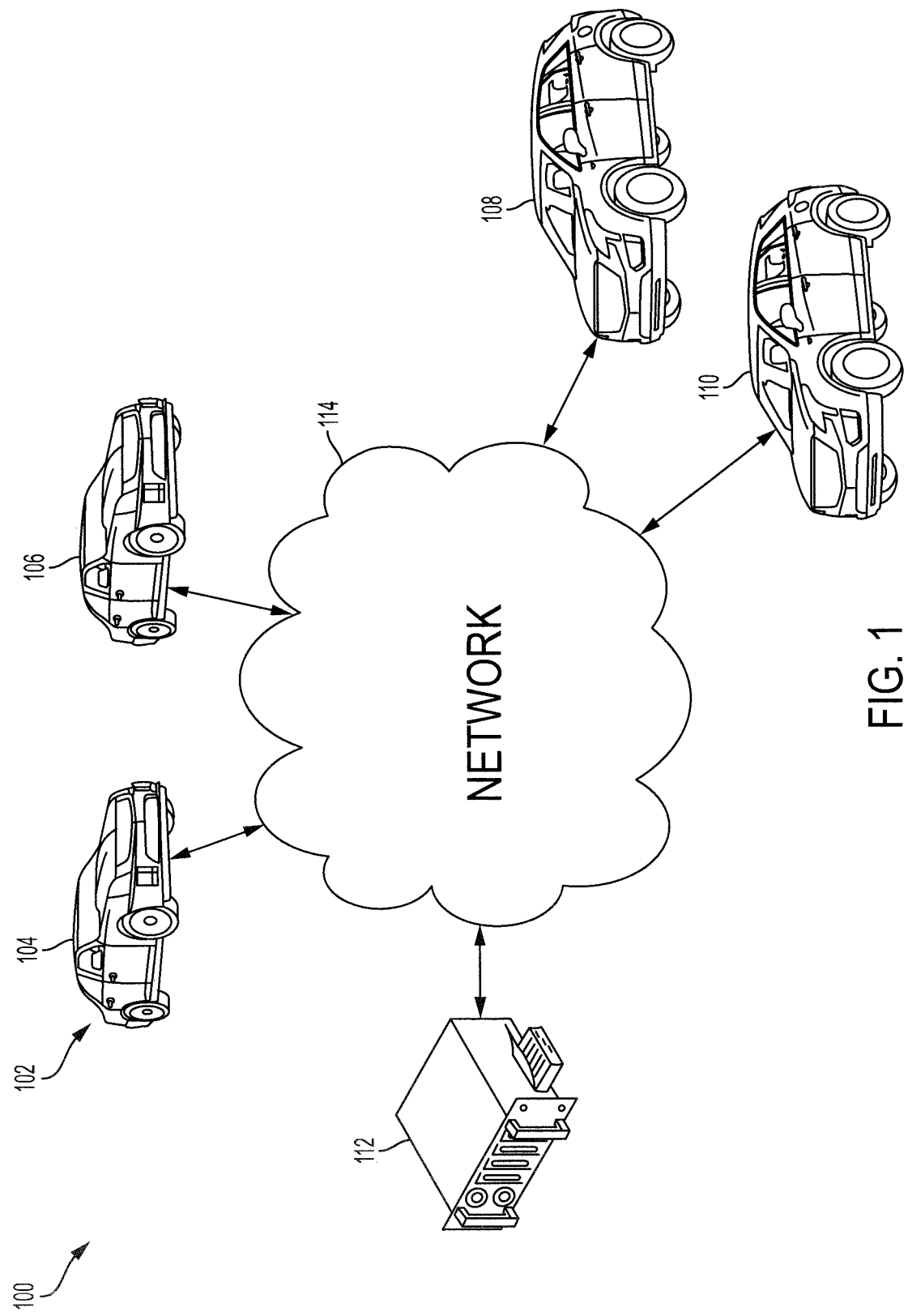
FIG. 1 is a block diagram illustrating a system for using distributed machine learning to identify when faults are likely to occur with electronic components of vehicles according to an embodiment of the present invention.

Turning to FIG. 1, a system 100 for analyzing a health status of one or more component of the vehicles is shown. In particular, the system 100 includes one or more vehicles 102 including a first vehicle 104, a second vehicle 106, a third vehicle 108, and a fourth vehicle 110, as an example. The first vehicle 104 and the second vehicle 106 may be of a first type, such as a Prius (or a sedan), and the third vehicle 108 and the fourth vehicle 110 may be of a second type, such as a Tundra (or a truck).

The system 100 may further include a machine learning server 112. The machine learning server 112 may communicate with each of the vehicles 102 via a network 114. The machine learning server 112 may be designed to receive data from each of the vehicles 102, such as sensor data corresponding to electronic components of the vehicles 102. The machine learning server 112 may design a model of the electronic components based on the sensor data, and may analyze the health status of the electronic components by comparing the sensor data to the model.

The machine learning server 112 may identify when a fault is likely to occur with the electronic device of the one or more of the vehicles 102 based on the comparison. The machine learning server 112 may then transmit a signal to the corresponding vehicle 102 such that the vehicle 102 can output data indicating that the fault is likely to occur with the corresponding electronic component.

Figure 2:
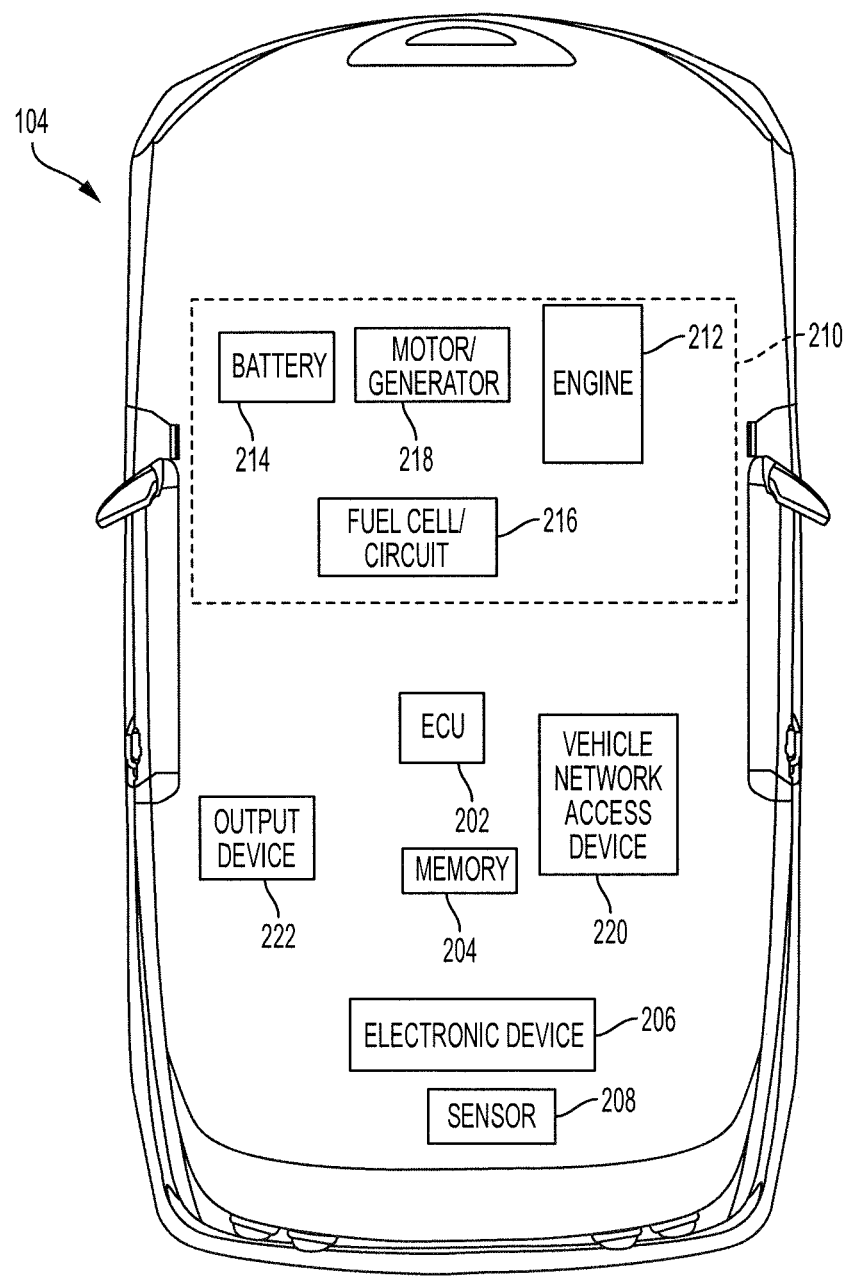
FIG. 2 is a block diagram illustrating an exemplary vehicle designed for use with the system of FIG. 1 according to an embodiment of the present invention.

Referring now to FIG. 2, the vehicle 104 may include an electronic control unit (ECU) 202, a memory 204, an electronic device 206, and a sensor 208. The vehicle 104 may further include a power source 210 which may include one or more of an engine 212, a battery 214, a fuel cell circuit 216, and/or a motor generator 218. In some embodiments, the vehicle 104 may be an electric vehicle, a hybrid vehicle, a plug-in hybrid vehicle, or the like. The vehicle 104 may further include a vehicle network access device 220 and an output device 222.

The ECU 202 may be coupled to each of the components of the vehicle 100 and may include one or more processors or controllers, which may be specifically designed for automotive systems. The functions of the ECU 202 may be implemented in a single ECU or in multiple ECUs. The ECU 202 may receive data from components of the vehicle 100, may make determinations based on the received data, and may control the operation of components based on the determinations.

In some embodiments, the vehicle 100 may be fully autonomous or semi-autonomous. In that regard, the ECU 202 may control various aspects of the vehicle 100 (such as steering, braking, accelerating, or the like) to maneuver the vehicle 100 from a starting location to a destination location.

The memory 204 may include any non-transitory memory and may be capable of storing data usable by the ECU 202. For example, the memory 204 may store instructions usable by the ECU 202 to control operation of the power source 210.

The engine 212 may convert a fuel into mechanical power. In that regard, the engine 212 may be a gasoline engine, a diesel engine, or the like.

The battery 214 may store electrical energy. In some embodiments, the battery 214 may include any one or more energy storage device including a battery, a fly-wheel, a super-capacitor, a thermal storage device, or the like.

The fuel cell circuit 216 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel cell circuit 216 may be stored in the battery 214. In some embodiments, the vehicle 104 may include multiple fuel cell circuits including the fuel cell circuit 216.

The motor-generator 118 may convert the electrical energy stored in the battery 214 (or electrical energy received directly from the fuel cell circuit 216) into mechanical power usable to propel the vehicle 104. The motor-generator 118 may further convert mechanical power received from the engine 212 or wheels of the vehicle 104 into electricity, which may be stored in the battery 214 as energy and/or used by other components of the vehicle 104. In some embodiments, the motor-generator 118 may also or instead include a turbine or other device capable of generating thrust.

The vehicle network access device 220 may include any port or device capable of facilitating communications between the ECU 202 and an external device (such as the machine learning server 112 of FIG. 1). For example, the vehicle network access device 220 may communicate via Wi-Fi, Bluetooth, a cellular protocol, a vehicle to vehicle protocol, 4G, 5G, or the like.

The output device 222 may include any output device such as a speaker, a display, an LED indicator, or the like. The output device 222 may output data as instructed by the ECU 202.

The electronic device 206 may include any electronic device included in the vehicle 104. In that regard and in some embodiments, the electronic device 206 may be incorporated or included in another component of the vehicle 104 such as the fuel-cell circuit 116, the battery 214, the motor generator 218, or the like. In some embodiments, the electronic device 206 may include a printed circuit board (PCB) with one or more logic device coupled thereto. In some embodiments, the electronic device 206 may include a power device such as a power converter, a transformer, a coil, or the like. For example, the electronic device 206 may include a semiconductor component or a power converter.

The sensor 208 may be coupled to the electronic device 206. For example, the sensor 208 may be positioned on, integrated with the electronic device 206, positioned in line with the electronic device 206, positioned adjacent to the electronic device 206, or the like. The sensor 208 may detect data corresponding to the electronic device 206. For example, the sensor 208 may detect one or more of a cycling current of the electronic device 206, a temperature of the electronic device 206, a thermal resistance of the electronic device 206, a power step of the electronic device 206, a voltage level of the electronic device 206, a current level of the electronic device 206, a cycle count of the electronic device 206, or the like.

Referring to FIGS. 1 and 2, the machine learning server 112 may receive detected data from the sensor 208. The machine learning server 112 may initially build a model of the electronic device 206 based on the received sensor data. The machine learning server 112 may continue to receive the data from the sensor 208 and may identify when a fault is likely to occur with the electronic device 206 based on the received sensor data. The machine learning server 112 may then transmit a message to the ECU 202 via the vehicle network access device 220 indicating that the fault is likely to occur with the electronic device 206. The ECU 202 may then control the output device 222 to output data indicating that the fault is likely to occur with the electronic device 206 such that an operator of the vehicle 104 may take the vehicle 104 to a service center for service. In that regard, the operator can get the electronic device 206 replaced or repaired.

Figure 3:
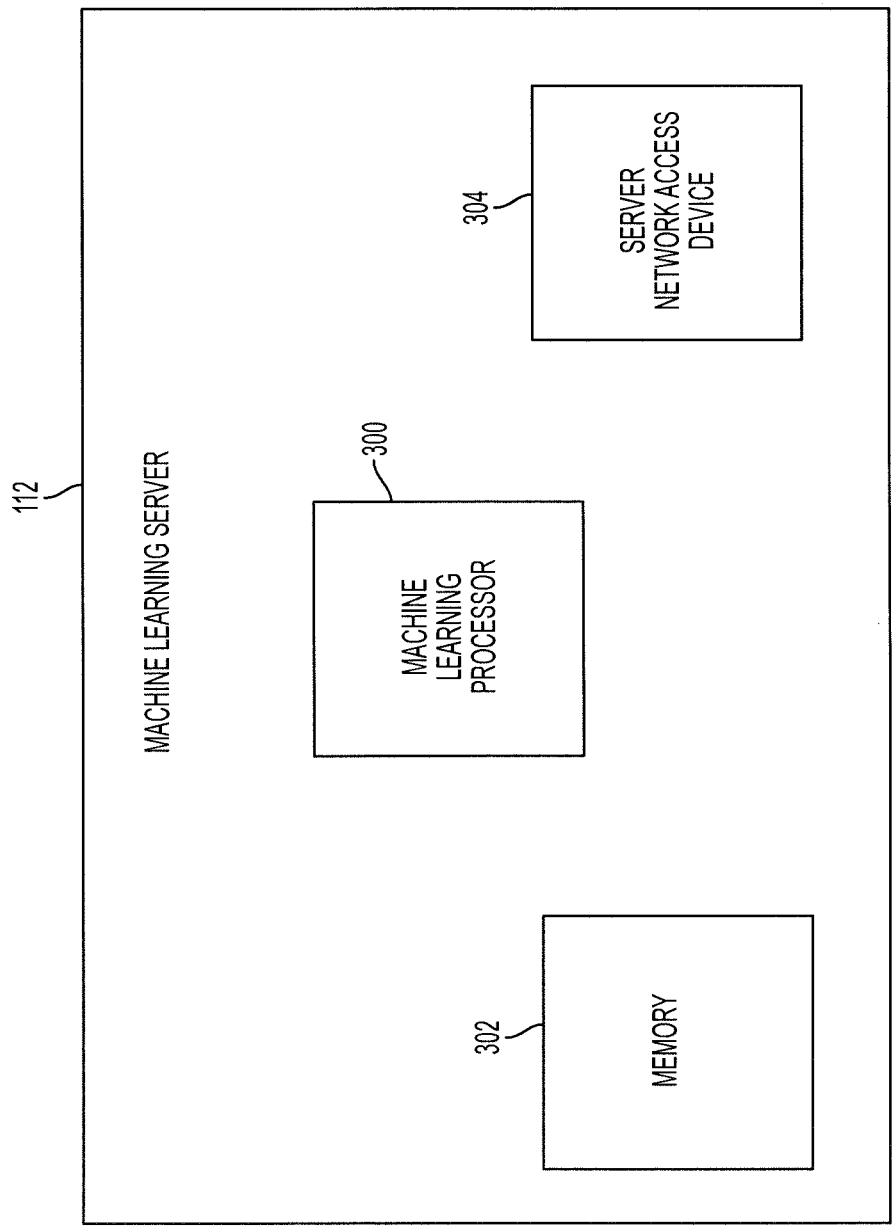
FIG. 3 is a block diagram illustrating a machine learning server designed for use with the system of FIG. 1 according to an embodiment of the present invention.

Turning now to FIG. 3, various features of the machine learning server 112 are illustrated. In particular, the machine learning server 112 includes a machine learning processor 300, a memory 302, and a server network access device 304.

The machine learning processor 300 may receive the data transmitted from the sensors of the vehicles 102 of FIG. 1. The machine learning processor 300 may store the data in the memory 302, may analyze the data, and may generate a model of the electronic device 206 based on the received data. The machine learning processor 300 may then store the model in the memory 302. The machine learning processor 300 may continue to receive the sensor data and may identify when faults are likely to occur by comparing the sensor data to the model stored in the memory 302.

The memory 302 may include any non-transitory memory. In that regard, the memory 302 may store data usable by the machine learning processor 300. For example, the memory 302 may store the model of the electronic device 206 for each of the vehicles 102 of FIG. 1. In some embodiments, the memory 302 may store a single model that corresponds to the electronic component of the first vehicle 104 and the second vehicle 106, and a single model that corresponds to the electronic component of the third vehicle 108 and the fourth vehicle 110. In some embodiments, the memory 302 may store a model of the electronic device that is the same for each of the vehicles 102. In some embodiments, the memory 302 may store a separate model for each of the vehicles 102.

The server network access device 304 may include any port or device capable of facilitating communications between the machine learning processor 300 and an external device (such as one or more of the vehicles 102 of FIG. 1). For example, the server network access device 304 may communicate via Wi-Fi, Bluetooth, a cellular protocol, a vehicle to vehicle protocol, 4G, 5G, or the like.

Figure 4:
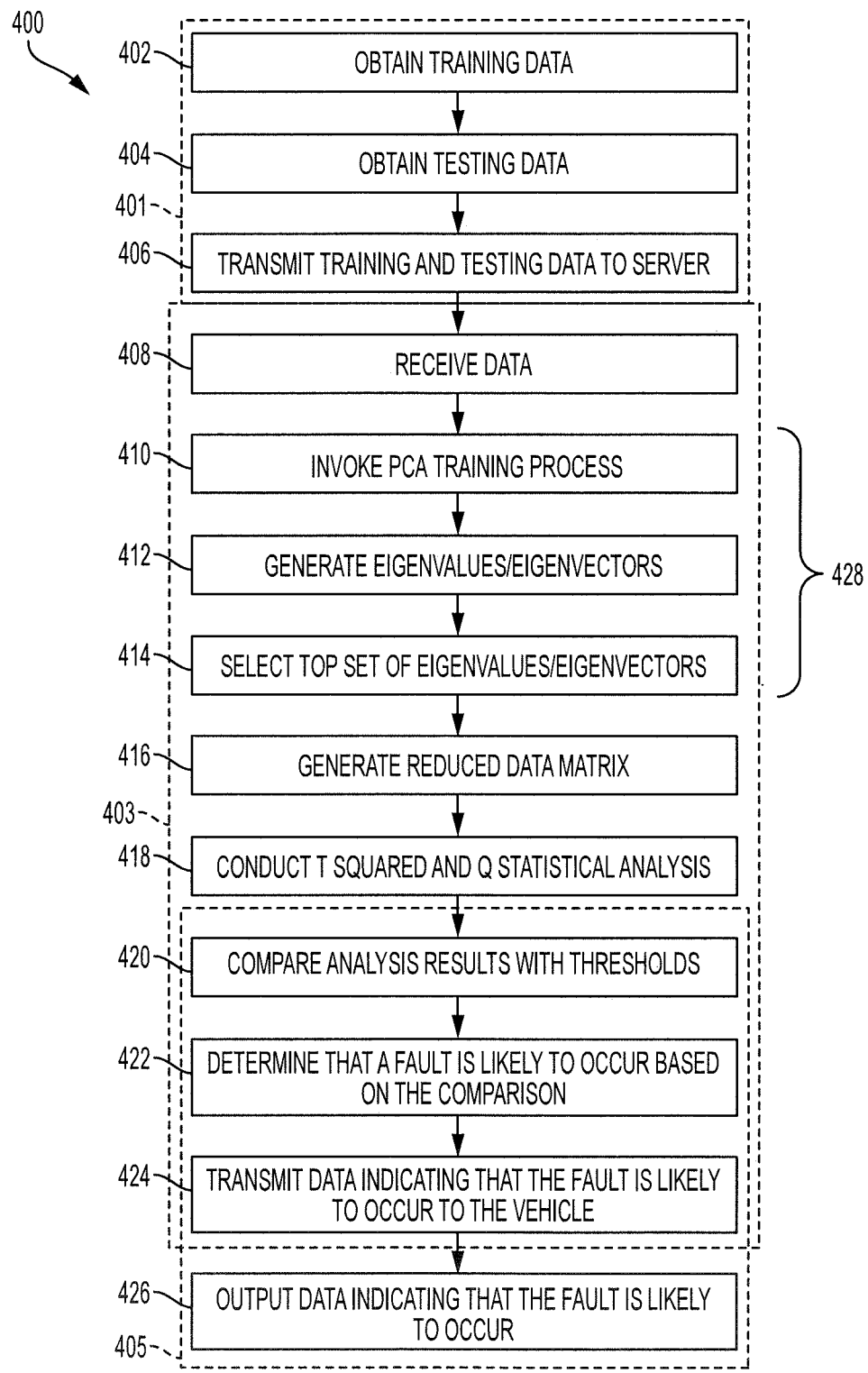
FIG. 4 is a flowchart illustrating a method for using distributed machine learning to identify when faults are likely to occur with electronic components of vehicles according to an embodiment of the present invention.

Turning now to FIG. 4, a method 400 for conducting fault monitoring of an electronic device of a vehicle is shown. In some embodiments, a first portion 401 of the method 400 may be performed by a vehicle or a component thereof, a second portion 403 may be performed by a machine learning server or a component thereof, and a third portion 405 may be performed by the vehicle or a component thereof. In some embodiments, blocks 420, 422, and 424 may be performed by the vehicle, and in some embodiments blocks 420, 422, and 424 may be performed by the machine learning server 112.

The division of the various blocks into the first portion 401, the second portion 403, and the third portion 405 may allow for computationally expensive processes (such as the processes performed in the second portion 403) to be performed by the machine learning server which may have a greater capacity for performing such processes.

Training data may be received in block 402 and testing data may be received in block 404. The training data and the testing data may generally be the data that is received from the one or more sensors positioned on, integrated with, positioned in line with, or positioned adjacent to the electronic device 206. Accordingly, the training data and the testing data may be collectively referred to herein as sensed data. In some embodiments, the training data and the testing data may generally be from the same data. That is, the data that is received from the sensors is split up, with one portion of the data being designated as the training data and the other portion being designated as the testing data. For example, about 60% of the data, about 70% of the data, about 80% of the data, about 90% of the data, or the like may be designated as training data, and the remaining portion of the data may be designated as the testing data. Other percentages are also acceptable without departing from the scope of the present disclosure.

The training data may refer to data that is used for the purposes of creating and/or updating a machine learning model of the electronic component. The testing data may refer to data that is used, based on the machine learning model, to determine whether an anomaly exists, to predict potential issues (i.e., determine whether a fault is likely to occur with the electronic device), or the like.

In block 406, the ECU of the vehicle may transmit the training data and the testing data to the machine learning server via the vehicle network access device and the server network access device.

In block 408, the machine learning server may receive the data. In particular, the training data and the testing data may be received by the machine learning processor of the machine learning server.

At block 410, the machine learning processor may begin generating a model of the electronic device using a machine learning algorithm. For example, the machine learning processor may use principal component analysis (PCA) to at least one of build or update the machine learning model of the electronic device. In that regard, the model may be a PCA model of the electronic device. In some embodiments, the model of the electronic device may be generated in a portion 428 of the method 400 that includes one or more of blocks 410, 412, and 414, and the portion 428 may be entirely referred to as PCA analysis.

Figure 5:
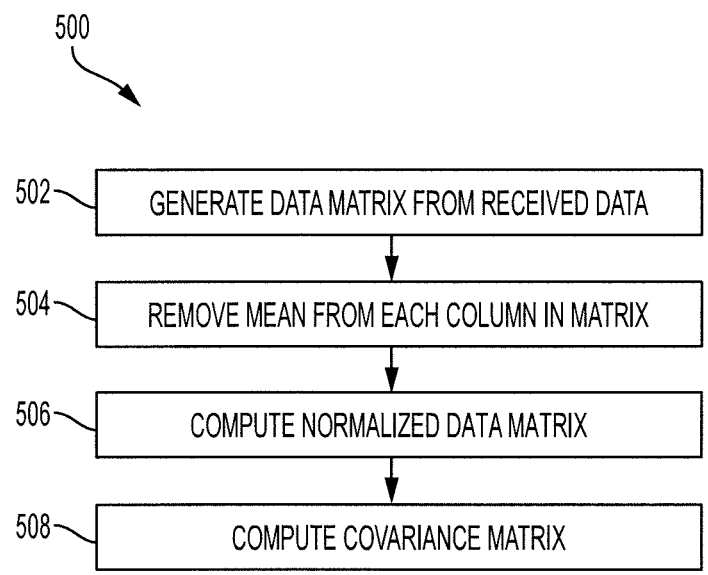
FIG. 5 is a flowchart illustrating an exemplary machine learning method using principal component analysis (PCA) according to an embodiment of the present invention.

Turning now to FIG. 5, a method 500 illustrates exemplary implementation of generating a PCA model, such as that performed in block 510. In block 502, a data matrix is generated from the data that is received. The data matrix may generally include each type of data that has been received from the one or more sensors and transmitted to the server computing device (or received by the ML-ECU). The data may include one or more of a device cycling current, a change in device temperature, a normalized junction-to-ambient thermal resistance, a power step, a device maximum junction temperature, a device minimum junction temperature, a Vcold measurement, a Vhot measurement, and a Von cycling measurement.

This data is illustrative only, and the data matrix may be generated from other types of data, fewer data types, or more data types without departing from the scope of the present disclosure. One illustrative example of matrix generation may include the following. A quantity of measurements may exist (e.g., three measurements: cycling current, Von cycling measurement and delta temperature), and each measurement may have a number of data samples (e.g., 2000). The measured data may be organized as a matrix X, an N by p matrix, where N=2000 is the quantity of data samples and p=3 is the quantity of features (e.g., attributes, measurements).

In block 504, the mean from each column in the data matrix may be removed such that a normalized data matrix can be computed at block 506. As such, the new, normalized matrix may reflect data that is on the same scale. That is, certain data received from a sensor may be on a larger scale than other data received from another sensor (e.g., first data may be on a first order of magnitude that is greater than the second data on a second order of magnitude). Normalizing the data ensures that all of the data is on the same magnitude. Stated differently, because the features have different ranges of values, the variabilities of the features may be difficult to observe. Therefore, the mean of each feature may be removed to adjust all the features into similar ranges. One illustrative example of matrix normalization may include computing the mean of each column feature according to Equation (1) below and removing the mean from each column to form a new data matrix $X_1$ according to Equation (2) below:

$$m = \frac{X^T e}{N}; \, e \sim N \text{ column vector of } 1^s \quad \text{Equation 1}$$

$$X_1 = X - em^T = \left(I - \frac{ee^T}{N}\right)X \quad \text{Equation 2}$$

At block 506, a covariance matrix may be computed. That is, the variants of each of the data points may be calculated and placed into matrix form. The covariance matrix P generalizes the notion of variance to p=3 dimensions. Accordingly, the p by p (here, a 3 by 3) covariance matrix of data matrix $X_1$ described above may be computed according to Equation (3) below:

$$P = X_1^T X_1 \quad \text{Equation 3}$$

In various embodiments, the method 500 may be performed using data from a single vehicle to create a model, of the electronic device for the single vehicle. In some embodiments, the method 500 may be performed using data from multiple vehicles to create a single model that can be used for each of the multiple vehicles. For example, the method 500 may be performed to create a model of a power converter for a fleet of vehicles of the same type. As another example, the method 500 may be performed to create a model of a power converter for a fleet of vehicles that are located in the same geographical region.

Creating a single model for multiple vehicles may conserve processing power and memory. For example, only a single model of a power converter may be stored in a memory, and the single model may be used for a fleet of 20, 40, 100, 500, or the like vehicles.

In some embodiments, the machine learning processor may perform the method 500 to create a separate model for each vehicle using data collected from multiple vehicles. This may be advantageous when the machine learning processor fails to receive sensor data from a given vehicle for a period of time during which the electronic device or the corresponding sensor may begin to operate in a faulty manner. By building the model based on data from multiple vehicles, the model may be more accurate than if it were built using data from a sensor that is either faulty or corresponds to an at least partially faulty electronic component.

Returning reference to FIG. 4 and in block 412, Eigenvalues and Eigenvectors may be generated from the covariance matrix that was generated in block 508 of the method 500 of FIG. 5. For example, Eigen decomposition of the covariance matrix P may be performed and the Eigen vectors corresponding to the top k eigenvalues∃Equation (4) below:

$$\frac{\sum_{i=1}^{k} \lambda_i}{\text{trace}(P)} > Th \, (0.95) \quad \text{Equation 4}$$

Where $P = V \Lambda V^T$;

$\lambda_1 \geq \lambda_2 \geq L \geq \lambda_k \geq \lambda_{k+1} \geq L \geq \lambda_p$ If k=2 satisfies Equation (4), the top 2 Eigenvalues and the corresponding Eigenvectors may represent the most variability of all the data. As such, the top two Eigenvalues and the corresponding Eigenvectors may be selected in block 414. It should be understood that the top Eigenvalues that are selected represent the most variability in the data that was received by the sensors. In addition, it should be understood that more variability in the data that was received by the sensors is the most valuable for the purposes of extracting information therefrom and determining whether an anomaly exists for the purposes of predicting potential failures.

Although the portion 428 is shown to be performed using PCA analysis, the present disclosure is not limited to such an analysis. Other machine learning algorithms capable of generating and/or updating a model may be used in place of the portion 428 without departing from the scope of the present disclosure.

In block 416, a reduced data matrix or indicator $X_2$ may be generated from the received data for each vehicle. For example, the matrix $X_1$ can be simplified by multiplying the top 2 Eigenvectors. Equation (5) below may be used to calculate the reduced data matrix, where $V_k$ is a p=3 by k=2 matrix corresponding to the first 2 columns of V. The N=2000 by k=2 normalized principal component (PC) matrix may be represented by Equation (6) below:

$$X_2 = X_1 V_k \quad \text{Equation 5}$$

$$Y = X_2 \Lambda_k^{-1/2} \quad \text{Equation 6}$$

In addition, the N by p residual matrix, R and its p by p covariance matrix, $\Sigma_r$ may computed using Equation (7) below. The trend of residual may be used to distinguish failure types and data error when an anomaly occurs, indicating that the electronic component is likely to fail.

$$R = X_1[I_p - V_k V_k^T]$$ Equation 7

$$\Sigma_r = [I_p - V_k V_k^T]P[I_p - V_k V_k^T]$$

In block 418, the machine learning processor may perform a T squared ($T^2$) and Q statistical analysis of the resulting data to detect anomalies for each of the vehicles. In particular, Hotelling's $T^2$ statistic may be used as an anomaly detector, as depicted in Equation (8) below:

$$T^2(i) = \underline{x}_2^T(i)\Lambda_k^{-1}\underline{x}_2(i) = \overline{y}^T(i)\overline{y}(i); i=1,2,L,N$$ Equation 8

In Equation 8, $\underline{x}_2^T$ is the $i^{th}$ row of the $X_2$ matrix, and $\underline{y}^T(i)$ is the $i^{th}$ row of Y. Here, $$T^2 \sim \frac{k(N-1)}{N-k} F_{k,N} \sim \chi_k^2$$

for large N where $F_{k,N}$ is the Fisher F-distribution with k and (N−k) degrees of freedom. The $x_k^2$ is the chi-squared distribution with k degrees of freedom. The threshold for $T^2$ statistic may be provided from the Chi-square distribution table based on the degrees of freedom and level of significance. If the top 2 Eigenvalues are selected, the degree of freedom is 2, and if 1% level of significance is selected, it means the values below the selected threshold has 99% confidence to follow the chi-squared distribution.

In addition, the Q-statistic may be used to check the validity of the model and as a second anomaly detector. The Q-statistic may be computed using Equation 9 below:

$$Q(i) = \underline{x}_1^T(i)[I_p - V_k V_k^T]\underline{x}_1(i); i=1,2,L,N$$ Equation 9

In Equation 9, $\underline{x}_1^T$ is the row of the $X_1$ matrix, and $$Q \sim \sum_{i=k+1}^{p} \lambda_i z_i^2; z_i^2 \sim \chi_1^2.$$

The Q-Statistic may generally be the sums of squares of the residuals for an observation vector after being fitted by the first k principal components. The Q-statistic is also a weighted combination of (p−k) chi-squared random variables where the weights are the (p−k) neglected Eigenvalues of the covariance matrix.

In block 420, the $T^2$ and Q analysis results may be compared with a threshold to determine whether an anomaly exists. In block 422, the machine learning processor may determine that a fault is likely to occur based on the comparison.

Figure 6:
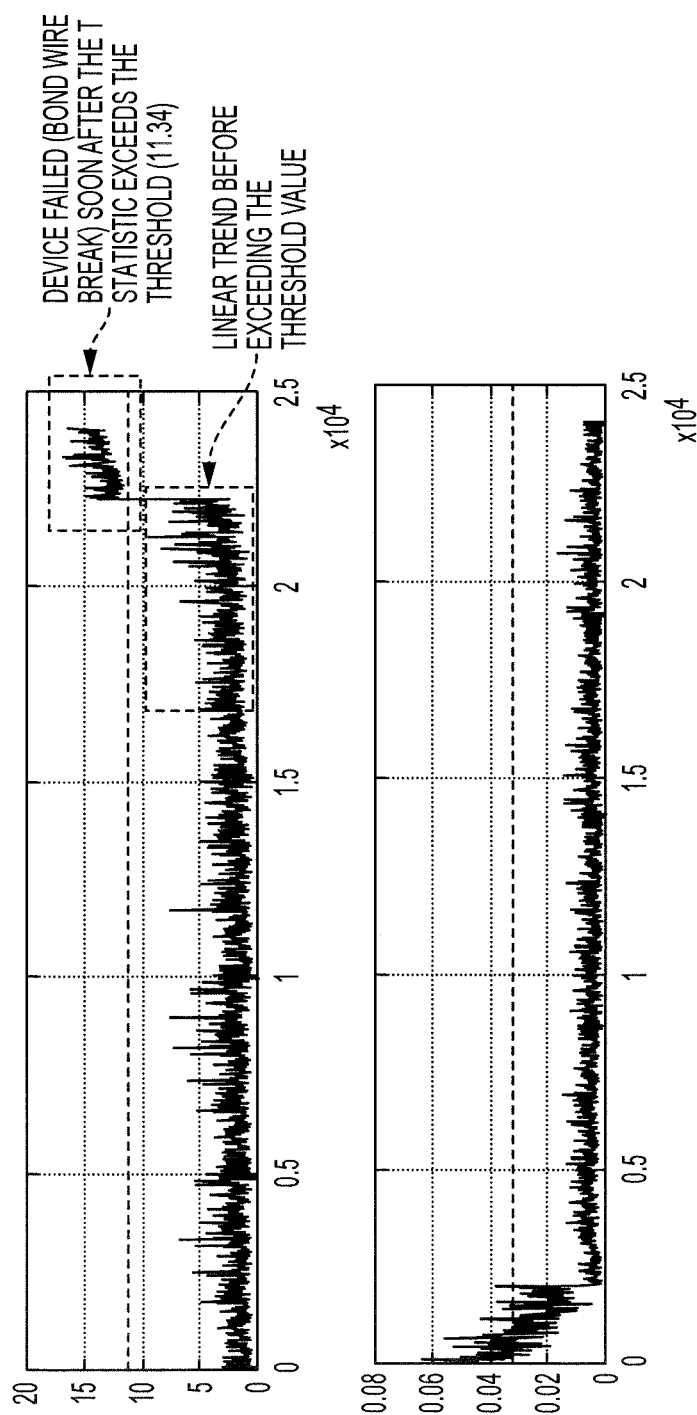
FIG. 6 is a graph illustrating T squared and Q statistical plots over a period of time according to an embodiment of the present invention.

For example, if the results of the analysis are above a threshold and/or trending toward a threshold, an anomaly may be determined, indicating that the electronic component is likely to fail. If the results of the analysis are below a threshold and/or are not trending toward a threshold, no anomaly may be determined, indicating that the electronic component is unlikely to fail relatively soon. For example and as shown in FIG. 6, the threshold may be about 11.34. When the results of the analysis exceed the threshold, it may be determined that a failure is likely to occur. As such, when the results start trending towards the threshold, an anomaly may be determined in some embodiments, indicating that the fault is likely to occur.

If a fault is unlikely to occur (i.e., if the data is not indicative of an anomaly), data may be stored for future reference, but no action may be taken at the time. Otherwise, if a fault is likely to occur, the machine learning server may transmit data to the vehicle indicating that the fault is likely to occur. In embodiments in which block 420, 422, and 424 are performed on the vehicle, block 424 may be skipped.

In block 426, the ECU of the vehicle may receive the data indicating that the fault is likely to occur and may control an output device to output such information. For example, an output device may include a check engine light, which an ECU may illuminate in response to receiving the data indicating that the fault is likely to occur. As another example, the output device may include a display, which an ECU may control to output text data indicating that the fault is likely to occur. In some embodiments, the machine learning server may output data to another source, such as a user device associated with the vehicle (such as a mobile phone, smart pad, or the like), a repair facility, a manufacturer, a fleet operator, or the like.

Figure 7:
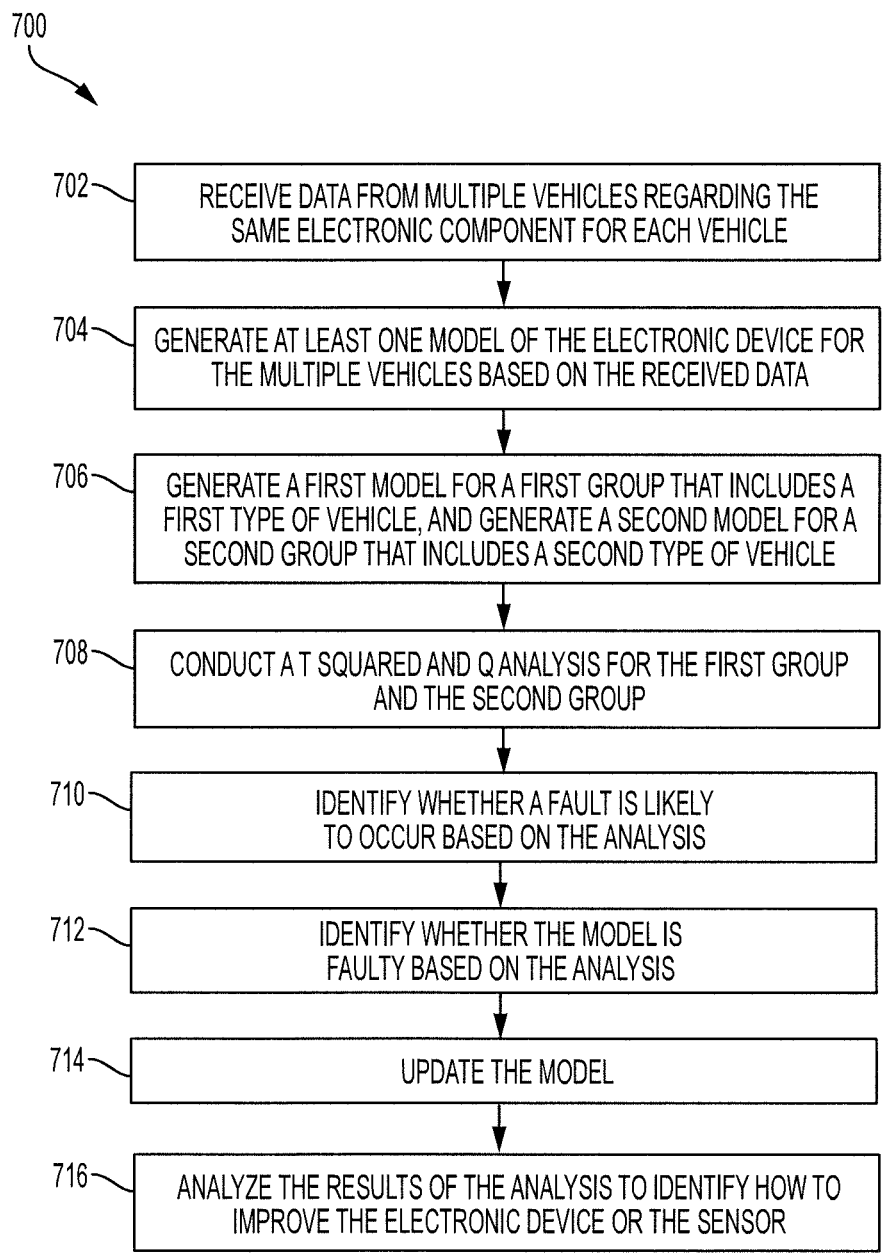
FIG. 7 is a flowchart illustrating a method for using distributed machine learning to identify when faults are likely to occur with electronic components of groups of vehicles according to an embodiment of the present invention.

Turning now to FIG. 7, another method 700 for analyzing a health status of a component of vehicles is shown. The method 700 begins in block 702 where a machine learning server may receive training data and testing data from multiple vehicles regarding the same electronic component for each vehicle. For example, the machine learning server may be operated by a fleet operator, such as a car rental agency, and may receive the detected data corresponding to a power converter for each vehicle of the fleet. As another example, the machine learning server may be operated by the vehicle manufacturer.

In block 704, the machine learning server (in particular, a machine learning processor of the machine learning server) may generate at least one model of the electronic device for the multiple vehicles based on the received data. In some embodiments, the machine learning processor may generate a single model of the electronic device for each vehicle based on the data received only from that specific vehicle. In some embodiments, the machine learning processor may generate a single model of the electronic device that is applicable to multiple vehicles based on the data received from the multiple vehicles. For example, the machine learning processor may generate the model of the electronic device using a machine learning algorithm, such as PCA.

In block 706, the machine learning processor may generate a first model of the electronic component for a first group of the fleet of vehicles that includes a first type of vehicle, and may generate a second model of the electronic component for a second group of the fleet of vehicles that includes a second type of vehicle. For example, the type of vehicle may refer to a vehicle make, a vehicle model, a geographical area in which the vehicles are located, a weather condition experienced by the vehicles (e.g., one type of vehicle may include vehicles that experience snow), or a common sensor drift associated with the vehicles. In that regard, the first model of the electronic device may be used to analyze a health status of the electronic component (i.e., identify whether a fault is likely to occur within the electronic component) of each of the first group of vehicles, and the second model of the electronic device may be used to analyze a health status of the electronic component of each of the second group of vehicles.

In block 708, the machine learning processor may conduct a T ($T^2$) squared and Q (Q) analysis for each of the first group of vehicles and the second group of vehicles using the first model and the second model, respectively. The T squared and Q analysis may be used to identify whether the electronic component on one of the vehicles is likely to experience a fault (the T squared analysis), and to identify whether the corresponding model is faulty (the Q analysis).

In block 710, the machine learning processor may identify whether a fault is likely to occur with the electronic component of one of the vehicles based on the T squared and Q analysis. For example, if the T squared value corresponding to the electronic component of a first vehicle reaches or exceeds a T squared threshold value then the machine learning processor may identify that a fault is likely to occur within the electronic component of the first vehicle. The T squared threshold may correspond to a threshold above which it has been determined that the electronic component is likely to fail.

The machine learning server may store data each time it identifies that a fault is likely to occur. This data may be valuable, for example, by allowing the machine learning server to identify commonalities between failures. For example, the machine learning server may identify that a certain electronic component fails within relatively few cycles for vehicles located in cold-weather locations. As another example, the machine learning server may identify that the sensor corresponding to a certain component and included in a first type of vehicle is susceptible to sensor drift, resulting in false failure detection.

In block 712, the machine learning processor may identify whether the model is faulty based on the analysis. In particular, the machine learning processor may compare the Q value to a Q threshold value. If the Q value reaches or exceeds the Q threshold value then the machine learning processor may determine that the model is faulty. The Q threshold value corresponds to a Q value above which it can be assumed that the model of the electronic component is faulty.

In block 714, the machine learning processor may update the model if the model is determined to be faulty. For example, the machine learning processor may remove certain data, may add certain data, or the like in order to update the model. In various embodiments, the machine learning processor may instead create a new model based on new or existing data.

In block 716, the results of the analysis may be analyzed in order to identify how to improve the electronic device or the sensor. As mentioned above, the machine learning server may identify commonalities between failures. For example, if the machine learning server identifies that a certain electronic component fails within relatively few cycles for vehicles located in relatively cold locations, a developer of the vehicle may decide to use a more rugged electronic component for vehicles destined for relatively cold weather locations.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for analyzing a health status of a component of vehicles, comprising:
   a vehicle having:
   an electronic device,
   a sensor configured to detect sensor data corresponding to at least one property of the electronic device,
   an output device configured to output data, and
   a vehicle network access device configured to transmit the sensor data; and
   a machine learning server separate from the vehicle and having a machine learning processor configured to:
   receive the sensor data,
   generate, using a machine learning algorithm, a model of the electronic device,
   determine that a fault is likely to occur with the electronic device by conducting a T squared statistical analysis of the sensor data using the model, and
   generate a signal to be transmitted to the vehicle network access device when the fault is likely to occur such that the output device of the vehicle outputs information indicating that the fault is likely to occur.

2. The system of claim 1 wherein the machine learning processor is further configured to determine that the model is faulty by conducting a Q analysis of the sensor data, and to generate a new model or update the model of the electronic device when the model is faulty.

3. The system of claim 1 wherein the machine learning processor is configured to receive the sensor data corresponding to multiple electronic devices of multiple vehicles and to generate the model of the electronic device using the sensor data corresponding to the multiple electronic devices of the multiple vehicles.

4. The system of claim 3 wherein the machine learning processor is further configured to determine that the model of the electronic device is faulty by conducting a Q analysis of the sensor data corresponding to the multiple electronic devices of the multiple vehicles, and to generate a new model or update the model of the electronic device when the model is faulty.

5. The system of claim 3 wherein the machine learning processor is further configured to at least one of:
   generate a separate model of the electronic device for each of the multiple vehicles; or
   generate a single model of the electronic device for use with each of the multiple vehicles.

6. The system of claim 3 wherein the machine learning processor is further configured to generate a first model of the electronic device for a first group of the multiple vehicles that each include a first type of vehicle, and to generate a second model of the electronic device for a second group of the multiple vehicles that each include a second type of vehicle.

7. The system of claim 6 wherein the first type of vehicle includes at least one of a vehicle make, a vehicle model, a geographical area in which the first group of the multiple vehicles are used, a weather condition experienced by the first group of the multiple vehicles, or a sensor drift of the first group of the multiple vehicles.

8. The system of claim 1 wherein the machine learning algorithm is a principal component analysis (PCA) algorithm.

9. The system of claim 1 wherein the sensor data includes at least one of a cycling current, a temperature, a thermal resistance, a power step, a voltage level, or a current level.

10. A system for analyzing a health status of a component of a vehicle, comprising:
    a plurality of vehicles each having:
    an electronic device, a sensor configured to detect sensor data corresponding to at least one property of the electronic device, an output device configured to output data, and a vehicle network access device configured to transmit the sensor data of the electronic device; and a machine learning server separate from each of the plurality of vehicles and having a machine learning processor configured to:

receive the sensor data of the electronic device for each of the plurality of vehicles, generate, using a machine learning algorithm, a model of the electronic device, determine that a fault is likely to occur with the electronic device of at least one of the plurality of vehicles by conducting a T squared statistical analysis of the sensor data using the model, and generate a signal to be transmitted to the vehicle network access device of the at least one of the plurality of vehicles when the fault is likely to occur such that the output device of the at least one of the plurality of vehicles outputs information indicating that the fault is likely to occur.

11. The system of claim 10 wherein the machine learning processor is further configured to determine that the model is faulty by conducting a Q analysis of the sensor data, and to generate a new model or update the model of the electronic device when the model is faulty.

12. The system of claim 10 wherein the machine learning processor is further configured to determine that the model of the electronic device is faulty by conducting a Q analysis of the sensor data corresponding to the electronic device of each of the plurality of vehicles, and to generate a new model or update the model of the electronic device when the model is faulty.

13. The system of claim 10 wherein the machine learning processor is further configured to at least one of:

generate a separate model of the electronic device for each of the plurality of vehicles; or generate a single model of the electronic device for use with each of the plurality of vehicles.

14. The system of claim 10 wherein the machine learning processor is further configured to generate a first model of the electronic device for a first group of the plurality of vehicles that each include a first type of vehicle, and to generate a second model of the electronic device for a second group of the plurality of vehicles that each include a second type of vehicle.

15. The system of claim 14 wherein the first type of vehicle includes at least one of a vehicle make, a vehicle model, a geographical area in which the first group of the plurality of vehicles are used, a weather condition experienced by the first group of the plurality of vehicles, or a sensor drift of the first group of the plurality of vehicles.

16. A method for analyzing a health status of a component of vehicles, comprising:

detecting, by a sensor coupled to or positioned near an electronic device of a vehicle, sensor data corresponding to at least one property of the electronic device;

transmitting, by a vehicle network access device of the vehicle, the sensor data of the electronic device;

receiving, by a machine learning processor of a machine learning server being separate from the vehicle, the sensor data of the electronic device;

generating, by the machine learning processor, a model of the electronic device;

determining, by the machine learning processor, that a fault is likely to occur with the electronic device by conducting a T squared statistical analysis of the sensor data using the model; and outputting, by an output device of the vehicle, information indicating that the fault is likely to occur.

17. The method of claim 16 further comprising:

determining, by the machine learning processor, that the model is faulty by conducting a Q analysis of the sensor data; and generating or updating, by the machine learning processor, the model of the electronic device when the model is faulty.

18. The method of claim 16 further comprising:

receiving, by the machine learning processor, the sensor data corresponding to multiple vehicles; and generating, by the machine learning processor, the model of the electronic device using the sensor data corresponding to the electronic device of each of the multiple vehicles.

19. The method of claim 18 further comprising at least one of:

generating, by the machine learning processor, a separate model of the electronic device for each of the multiple vehicles; or generating, by the machine learning processor, a single model of the electronic device for use with each of the multiple vehicles.

20. The method of claim 18 further comprising:

generating, by the machine learning processor, a first model of the electronic device for a first group of the multiple vehicles that each include a first type of vehicle; and generating, by the machine learning processor, a second model of the electronic device for a second group of the multiple vehicles that each include a second type of vehicle.

* * * * *